(12) United States Patent
Richez et al.

(10) Patent No.: US 8,469,395 B2
(45) Date of Patent: Jun. 25, 2013

(54) VEHICLE SEAT WITH A SIDE AIRBAG DEVICE

(75) Inventors: Olivier Richez, Rouen (FR); Sebastien Vanzieleghem, Ry (FR); Gilles Garret, Rouen (FR); Sylvain Langlet, Goincourt (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/379,881

(22) PCT Filed: Jun. 10, 2010

(86) PCT No.: PCT/EP2010/003492
§ 371 (c)(1),
(2), (4) Date: Dec. 21, 2011

(87) PCT Pub. No.: WO2011/006560
PCT Pub. Date: Jan. 20, 2011

(65) Prior Publication Data
US 2012/0091695 A1    Apr. 19, 2012

(30) Foreign Application Priority Data
Jul. 13, 2009   (DE) .......................... 10 2009 033 181

(51) Int. Cl.
*B60R 21/207* (2006.01)
(52) U.S. Cl.
USPC ....................................................... 280/730.2
(58) Field of Classification Search
USPC .................................................... 280/730.2
See application file for complete search history.

(56) References Cited

U.S. PATENT DOCUMENTS

| | | | | |
|---|---|---|---|---|
| 3,792,873 A | * | 2/1974 | Buchner et al. ............ | 280/743.1 |
| 5,524,924 A | * | 6/1996 | Steffens et al. ............ | 280/730.2 |
| 5,556,129 A | * | 9/1996 | Coman et al. .............. | 280/730.2 |

(Continued)

FOREIGN PATENT DOCUMENTS

| | | |
|---|---|---|
| DE | 106 46 698 A1 | 5/1997 |
| DE | 196 26 761 C1 | 10/1997 |

(Continued)

OTHER PUBLICATIONS

German Search Report—Dec. 21, 2009.

(Continued)

*Primary Examiner* — Paul Dickson
*Assistant Examiner* — Nicole Verley
(74) *Attorney, Agent, or Firm* — Brinks Hofer Gilson & Lione

(57) ABSTRACT

A safety device for a vehicle seat is disclosed. The vehicle seat has a backrest that extends in the transverse direction of the vehicle, the backrest having at least one lateral region and an upper region from which a headrest extends. Arranged on the backrest is a side airbag device with at least one inflator and a side airbag. The side airbag has a thorax section (22). The head section (26) emerges from the upper region of the backrest (12) beside the headrest (14) when the inflator is actuated, and the inner wall (26*a*) of the head section (26) is toward the interior of the vehicle relative to the inner wall (22*a*) of the thorax section (22). The inner wall (22*a*) of the thorax section (22) and the outer wall (26*b*) of the head section (26) are connected via overflow openings (31, 34).

6 Claims, 8 Drawing Sheets

U.S. PATENT DOCUMENTS

| | | | |
|---|---|---|---|
| 5,586,782 A * | 12/1996 | Zimmerman et al. | 280/730.2 |
| 5,615,909 A * | 4/1997 | Wipasuramonton et al. | 280/730.2 |
| 5,630,616 A * | 5/1997 | McPherson | 280/730.2 |
| 5,765,863 A * | 6/1998 | Storey et al. | 280/729 |
| 5,791,685 A * | 8/1998 | Lachat et al. | 280/743.1 |
| 5,803,485 A * | 9/1998 | Acker et al. | 280/728.2 |
| 5,853,191 A * | 12/1998 | Lachat | 280/730.2 |
| 5,913,536 A * | 6/1999 | Brown | 280/730.2 |
| 6,059,311 A * | 5/2000 | Wipasuramonton et al. | 280/729 |
| 6,065,772 A * | 5/2000 | Yamamoto et al. | 280/730.2 |
| 6,113,135 A * | 9/2000 | Tsutsumi | 280/730.2 |
| 6,199,900 B1 * | 3/2001 | Zeigler | 280/735 |
| 6,279,944 B1 * | 8/2001 | Wipasuramonton et al. | 280/730.2 |
| 6,425,602 B1 * | 7/2002 | Al-Amin et al. | 280/730.2 |
| 6,976,702 B2 * | 12/2005 | Yokota et al. | 280/730.2 |
| 7,055,853 B2 * | 6/2006 | Honda et al. | 280/730.2 |
| 7,357,411 B2 * | 4/2008 | Kurimoto et al. | 280/729 |
| 7,448,644 B2 * | 11/2008 | Zhong et al. | 280/729 |
| 7,549,672 B2 * | 6/2009 | Sato et al. | 280/730.2 |
| 7,559,573 B2 * | 7/2009 | Fukawatase et al. | 280/730.2 |
| 7,661,702 B2 * | 2/2010 | Ochiai et al. | 280/730.2 |
| 7,665,761 B1 * | 2/2010 | Green et al. | 280/733 |
| 7,770,921 B2 * | 8/2010 | Mueller et al. | 280/739 |
| 7,819,419 B2 * | 10/2010 | Hayashi et al. | 280/730.1 |
| 7,819,424 B2 * | 10/2010 | Toda et al. | 280/730.2 |
| 7,946,616 B2 * | 5/2011 | Ochiai et al. | 280/730.2 |
| 8,272,667 B2 * | 9/2012 | Schneider et al. | 280/730.1 |
| 8,322,747 B2 * | 12/2012 | Shankar | 280/729 |
| 2003/0168836 A1 * | 9/2003 | Sato et al. | 280/730.2 |
| 2006/0022441 A1 * | 2/2006 | Hayashi et al. | 280/730.2 |
| 2006/0103119 A1 * | 5/2006 | Kurimoto et al. | 280/730.2 |
| 2009/0200774 A1 * | 8/2009 | Nam et al. | 280/730.2 |

FOREIGN PATENT DOCUMENTS

| | | |
|---|---|---|
| EP | 0 769 428 B1 | 9/2001 |
| JP | 9-39710 | 9/1997 |
| WO | WO 2011/006560 A1 | 1/2011 |

OTHER PUBLICATIONS

PCT International Search Report—Oct. 6, 2010.

* cited by examiner

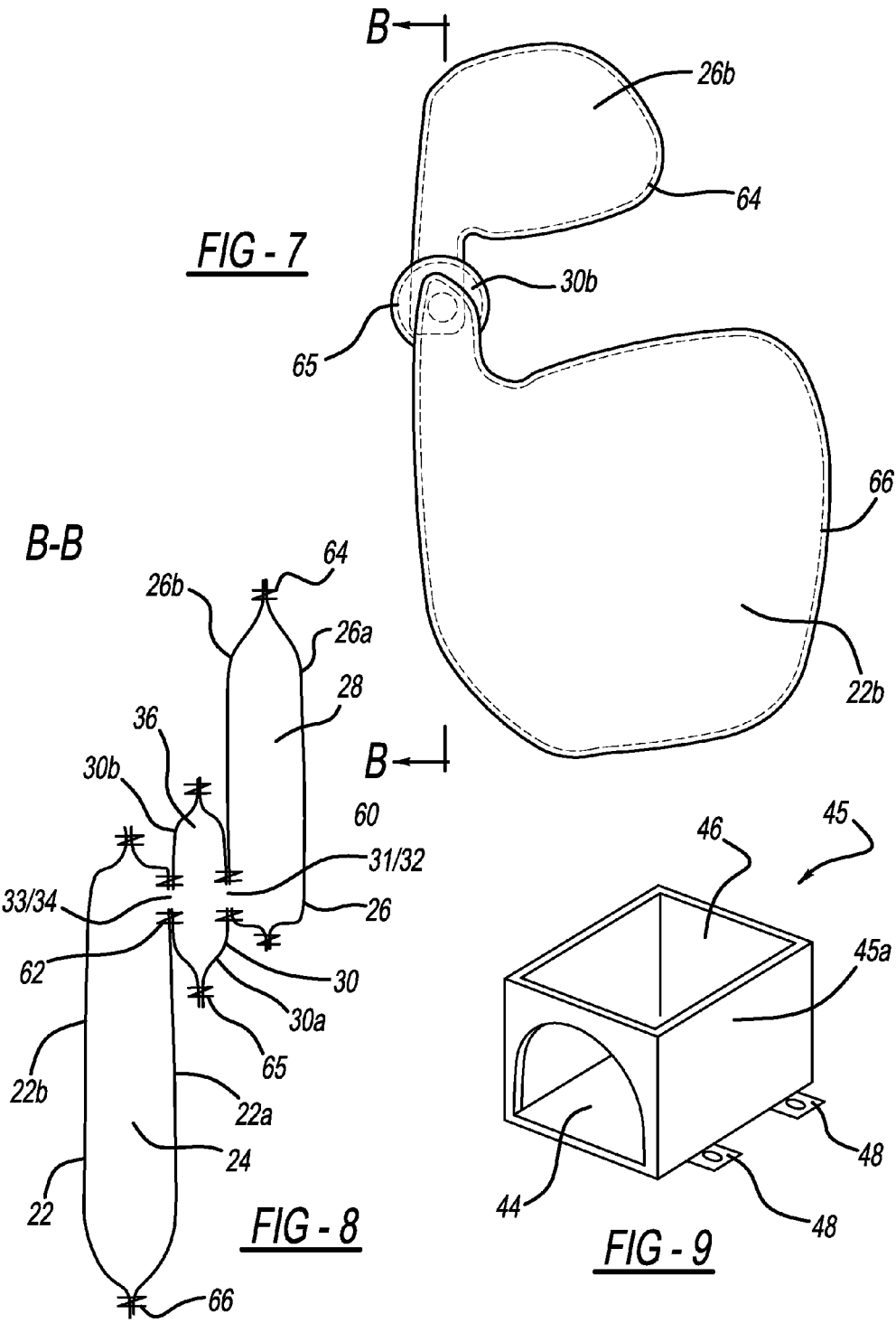

VEHICLE SEAT WITH A SIDE AIRBAG DEVICE

CROSS REFERENCE TO RELATED APPLICATIONS

This application claims priority to German Patent Application No. 102009033181.6, filed Jul. 13, 2009, and PCT International Patent Application No. PCT/EP2010/004392, filed Jun. 10, 2010.

TECHNICAL FIELD OF THE INVENTION

The invention relates to a vehicle seat to a side airbag device for installation in the vehicle seat, as well as to a safety device with the vehicle seat and a safety belt.

Side airbag devices are widely used in vehicle technology and serve to protect at least the thorax region of a vehicle occupant during a lateral collision. This kind of side airbag device features an airbag with at least one section that surrounds a chamber and an inflator—usually a gas generator—for filling said chamber. In particular, when no curtain airbag is provided in the vehicle, the side airbag can also serve to protect the head of the occupant, for which purpose either a separate head section that surrounds a head chamber can be provided, or a single section can be provided that covers both the thorax region and the head region. It is also possible for the side airbag to cover the pelvis region of the occupant, for which purpose a separate section can also be provided, or the thorax section can also cover the pelvic area.

BACKGROUND OF THE INVENTION

From DE 196 46 698 A1, a side airbag device is known with a thorax section and a separate head section. It is proposed here, on the one hand, that the thorax chamber and the head chamber are filled by separate gas generators, and on the other hand, that the thorax chamber is filled directly via a gas generator, and an overflow opening is provided, by means of which the thorax chamber fills the head chamber with gas.

It has been shown that when a safety belt is present, whose upper deviation point is not located on the armrest, but rather on the interior structure of the vehicle, i.e. usually on the B-pillar, the problem can occur, at least in some seat positions, that the expanding head section comes into contact with the safety belt, which obstructs the head section's expansion and reduces the desired protective effect, at least to some extent.

From the category-defining U.S. Pat. No. 6,425,602 B1, a vehicle seat with a side airbag device is known that has a thorax section and two head sections. The thorax section and the head section, which are arranged on the same side of the vehicle, are laterally offset, so that there is an empty space between them. The thorax section and the two head sections are separate airbags that are supplied with gas, if needed, by a compressed gas line. The system described is mechanically very complicated and relatively heavy.

DE 196 26 761 C1 shows a vehicle seat with a side airbag device, the side airbag device having a thorax section and a head section. Here too, the thorax section and the head section are designed as completely separate airbags that are connected via a compressed gas supply line. Here the head section is arranged in the headrest.

U.S. Pat. No. 5,615,909 shows a vehicle seat with a head airbag, which is arranged in an upper region of the backrest beside the headrest.

SUMMARY OF THE INVENTION

On this basis, the objective of the invention is to improve the prior art in a way that simplifies the manufacture and ease of assembly of the relevant components.

The invention provides for a side airbag with a head section and a thorax section. The head section of the side airbag is arranged in an upper region of the backrest beside the headrest and emerges upward from this upper region when the gas generator is actuated. When the side airbag is completely inflated, the head chamber and the thorax chamber are laterally offset in relation to each other, producing a gap, through which the strap of the safety belt can pass. The head section and the thorax section are thus preferably not connected to each other outside the vehicle seat.

The interior wall of the thorax section and the external wall of the head section each have an overflow opening, and these two overflow openings are connected directly or via a filling section of the side airbag. The inflator fills the thorax chamber, and gas flows from the thorax chamber into the head chamber.

This means that a connected airbag is proposed, which has both the head and the thorax chamber. This side airbag can be manufactured quite simply, and installation in the vehicle seat requires relatively little additional work and expense compared to a conventional side airbag.

Embodiments of the invention are seen as the exemplary example that will now be described in more detail with reference to the figures.

BRIEF DESCRIPTION OF THE DRAWINGS

In the drawings,

FIG. 7 shows a top view of an airbag that has been sewn together from the blanks shown in FIG. 6, FIG. 8 shows a cross section along the plane B-B in FIG. 7, FIG. 9 shows a housing for the head section of the airbag.

DETAILED DESCRIPTION OF THE DRAWINGS

Figure 1:
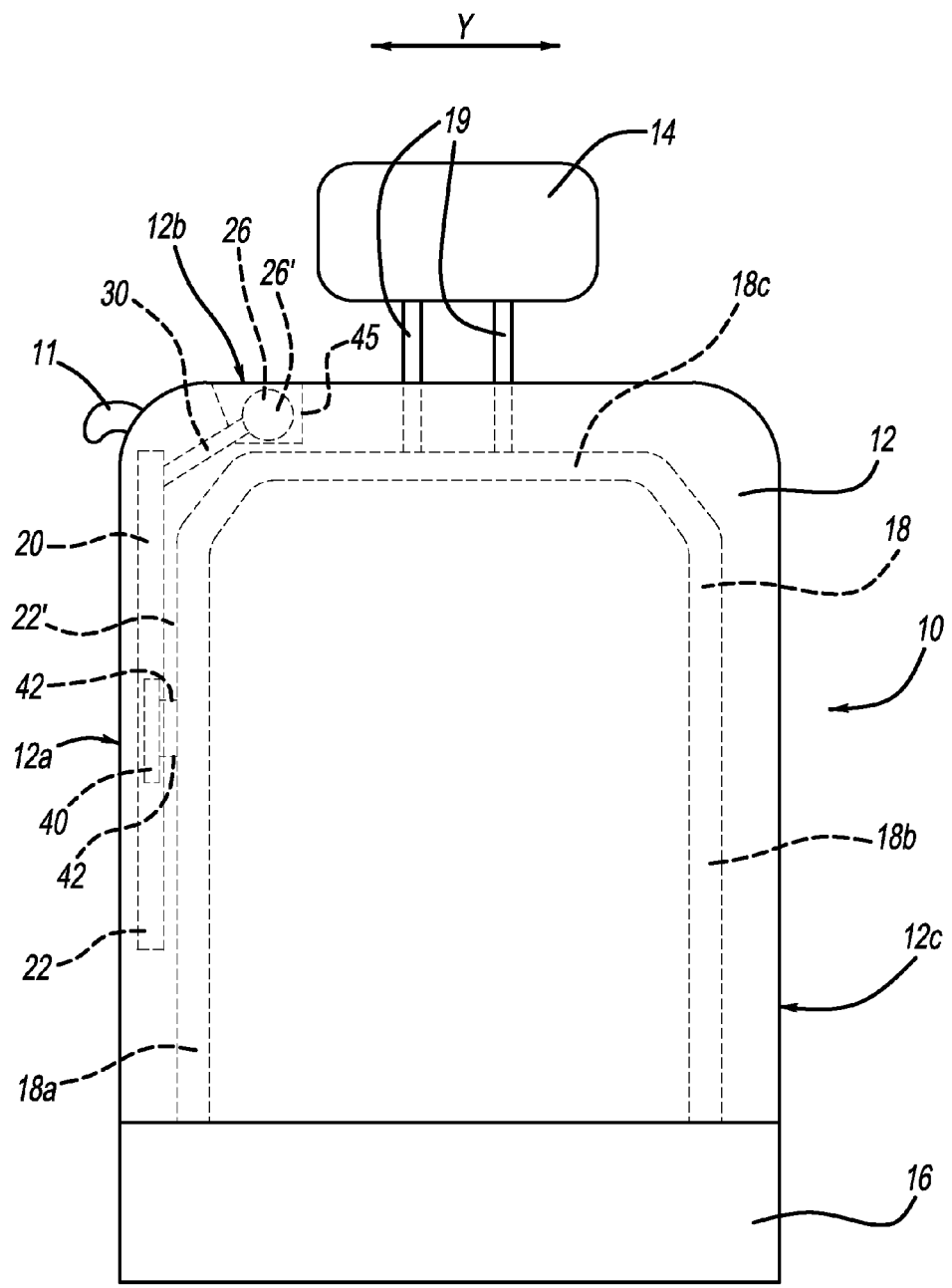
FIG. 1 shows a schematic top view of a passenger seat with a side airbag device.

FIG. 1 shows a schematic view of a vehicle seat 10, i.e. a top view of a passenger seat from the front. The internal components that are not visible in the top view are represented by dotted lines. The vehicle seat 10 has a backrest 12 that extends from a first lateral region (first lateral outer surface 12a) to a second lateral region (second lateral outer surface 12c) at right angles to the longitudinal direction of the vehicle, and a seat 16. A frame 18 with an outer lateral region 18a, an inner lateral region 18b, and an upper region 18c extends inside the backrest 12. Supports 19 for the headrest 14 extend from the upper region 18c of the frame. Arranged between the outer surface of the vehicle seat 10 and the frame 18 is a side airbag device with a side airbag 20 and a gas generator 40 that functions an inflator. Here, the gas generator 40 is connected by means of stays 42 directly or indirectly to the outer lateral region 18*a* of the frame 18.

The lateral airbag has three sections, namely a thorax section, which is present in the idle state shown in FIG. 1 as a rolled and/or folded thorax-section package 22', a head section, which in the idle state shown in FIG. 1 is present as a head-section package 26', and a filling section 30, which connects the thorax section 22 to the head section 26.

It can be seen from FIG. 1, that the thorax-section package 22', as in the case of most side airbag devices attached to the vehicle seat, is located between the outer lateral region 18*a* of the frame 18 and the first lateral outer surface 12*a* (which faces the vehicle door). In the conventional manner, a housing or a guiding element can be provided here, which is however, for the sake of clarity, not shown. The rolled-up and/or folded-up head section 24 that belongs to the head-section package 26' is arranged between the upper region 18*c* of the frame 18 and the upper outer surface 12*b* of the backrest 12. In this way, the head-section package 26' is located between the thorax-section package 22' and the headrest 14, so that the two packages 22' and 26' are offset in relation to each other in such a way that that the head-section package 26' is located farther into the interior of the motor vehicle than the thorax-section package 22'. Here, the head-section package 26' is accommodated in a housing 45 that is open at the top, and if required, the head-section package can be fastened to the housing. The housing, on the other hand, is attached to the lower region 18*c* of the frame 18. There is no direct connection between the head section 26 and the headrest 14.

Figure 2:
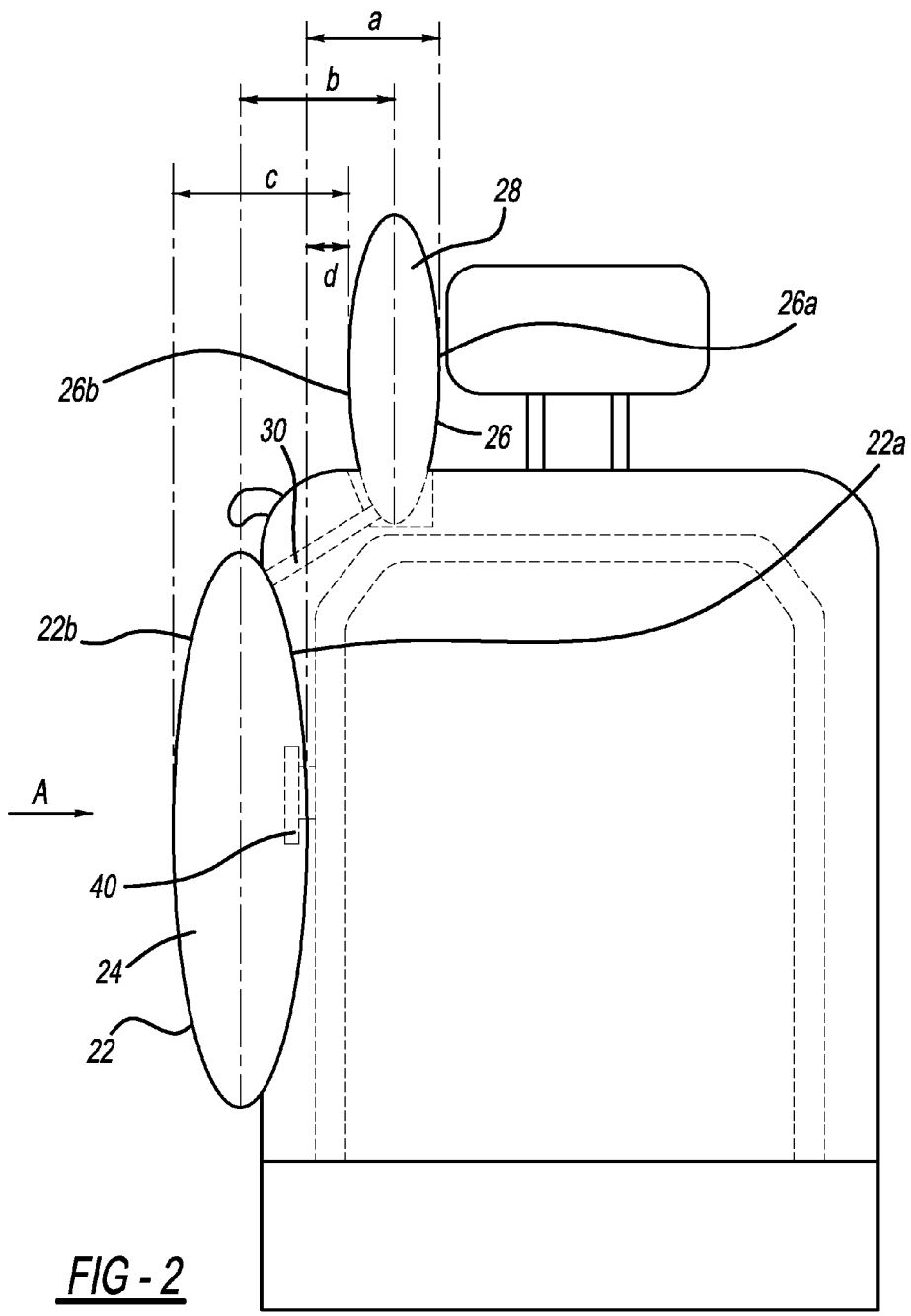
FIG. 2 shows the vehicle seat of FIG. 1, with a filled side airbag.

FIG. 2 shows the same as FIG. 1 after actuation of the gas generator 40, when the side airbag 20 is in its completely expanded state, with no external forces acting on it. It can be seen here that the thorax section 22, which surrounds the thorax chamber 24, and the head section 26, which surrounds the head chamber 28, when in an expanded state are also laterally displaced relative to each other, and thus in the transverse direction of the vehicle Y.

Both thorax section 22 and head section 26 each have an inner wall and an outer wall. The inner wall of the thorax section is referred to as 22*a*, the outer wall of the thorax section as 22*b*. Analogously, the inner wall of the head section is referred to as 26*a*, the outer wall of the head section as 26*b*. The inner walls 22*a* and 26*a* form the impact surfaces for the occupant who is to be protected. As can be seen from FIG. 2, both the inner walls 22*a*, 26*a* and the outer walls 22*b*, 26 are spaced apart, namely by the space 'a' and the space 'c' respectively; as are the middle planes, namely by the space 'b'. In the exemplary example shown, the outer wall 26*b* of the head section 26 is also laterally spaced apart from the inner wall 22*a* of the thorax section 22, namely by the space 'd', which is preferred.

Figure 3:
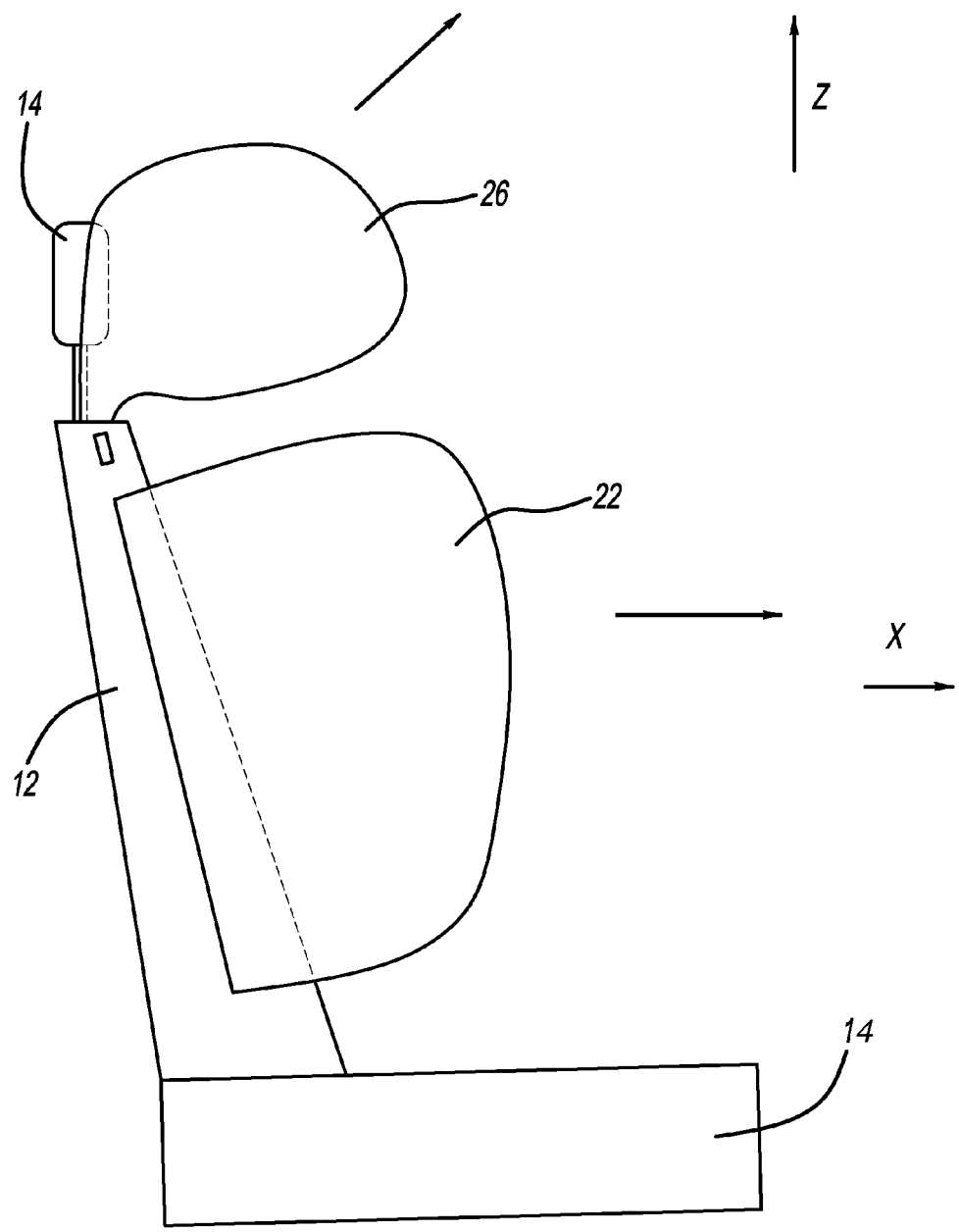
FIG. 3 shows a top view of the vehicle seat of FIG. 1, seen from direction A in FIG. 2.

FIG. 3 shows the same as FIG. 2 in a top view from direction A. It can be seen from FIGS. 2 and 3 that in both direction Y and direction Z, there is a space between the expanded thorax section 22 and the expanded head section 26. Thus, in a fully expanded state, there is a gap between the head section 26 and the thorax section 22. In FIG. 3, arrows also indicate the "net deployment directions" of head section 26 and thorax section 22. For the thorax section, they essentially indicate horizontally forward (X-direction), for the head section obliquely upward (X-Z direction). Here, the deployment of the head section initially takes place essentially in the Z-direction, i.e. upward, for which purpose the outer surface 12*b* of the backrest 12 has a predetermined breaking line. The initial upward expansion is also important in order to avoid a collision between the expanding head section and the shoulder of the occupant.

Figure 4:
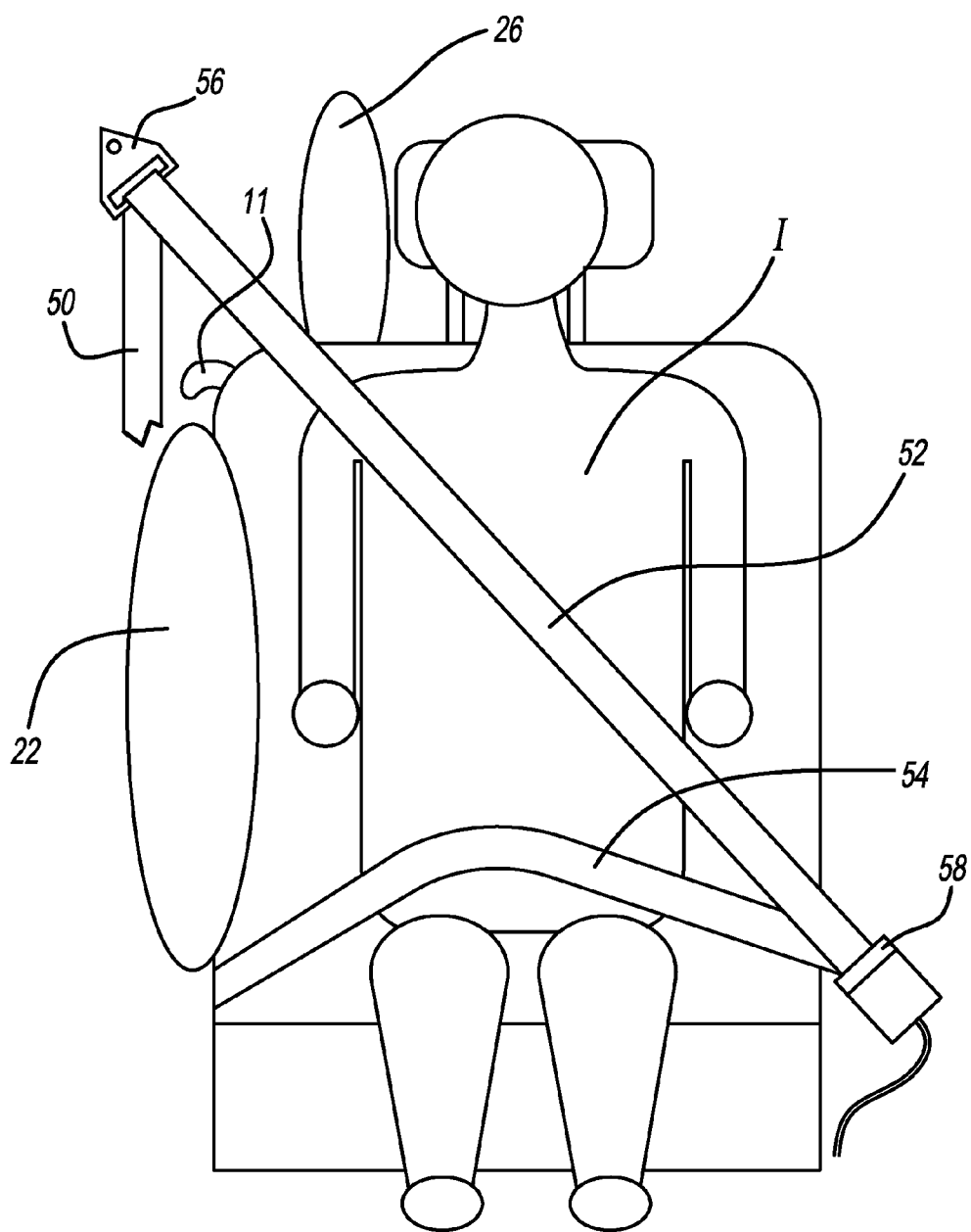
FIG. 4 shows the vehicle seat of FIG. 2, with an occupant, with seatbelt fastened, sitting in the passenger seat.
Figure 5:
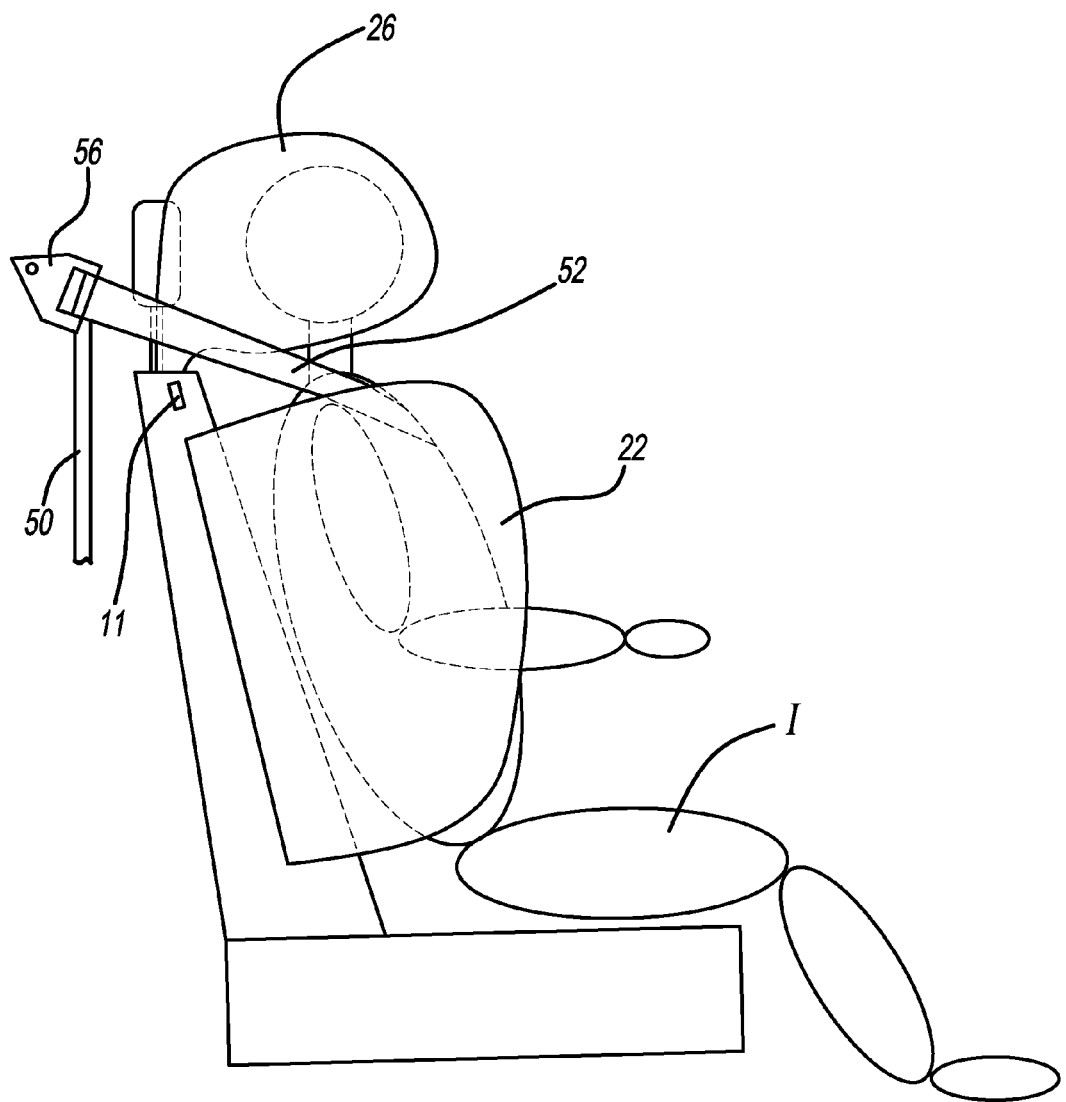
FIG. 5 shows the vehicle seat of FIG. 4 in a view corresponding to FIG. 3.

The purpose of the abovementioned space, or as the case may be the gap between the head section and the thorax section is readily visible in FIGS. 4 and 5, which essentially show the same as in FIGS. 2 and 3; while in FIG. 4, elements inside the vehicle seat, which are not visible, are not represented; and while in both figures, a vehicle passenger I sitting on the seat 10 and a safety belt system, by means of which the passenger is buckled down, are drawn in. The safety belt 50 that belongs to the safety-belt system features, in its buckled state, a shoulder section 52 and a pelvis section 54, which are separated by a belt tongue. Here the shoulder section 52 extends from an upper deflector 56 to this belt tongue 58. As readily seen in FIGS. 5 and 6, the shoulder section 52 extends through the gap between thorax section 22 and head section 26. The upper deflector 56 is arranged on the inner vehicle structure, usually on the B-pillar.

Figure 6:
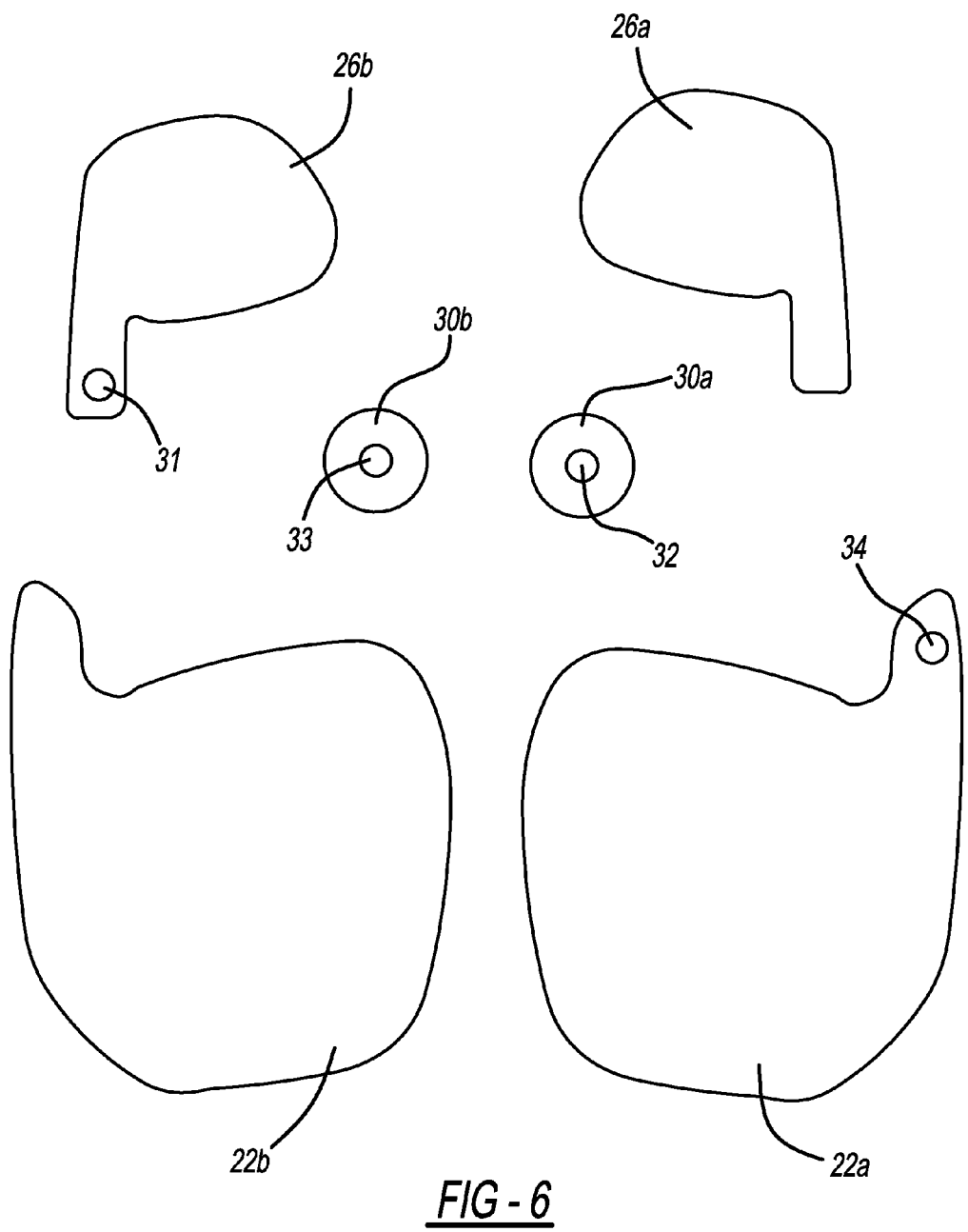
FIG. 6 shows blanks for a side gas bag.

It can be seen from FIGS. 5 and 6 that the selected arrangement of head section 26 and thorax section 22 prevents a collision between seatbelt and side airbag. That also applies during the expansion phase and is reinforced because the head section 26, which is arranged above in the backrest, initially expands upward. It can also be seen from FIGS. 5 and 6 that an adjusting lever 11 can be arranged without any difficulty in the upper region of the lateral outer surface 12, because no section of the side airbag has to emerge in this region. And this adjusting lever 11 cannot obstruct the expansion of the side airbag either.

A preferred exemplary example of a lateral airbag of the kind that can be used in the vehicle seat described above will now be described. It is characterized by simple manufacture and in that the desired space between head section and thorax section is easy to achieve:

FIG. 6 shows blanks for a lateral airbag 20, as described above. There is a blank for the inner wall 26*a* of the head section 26, a blank for the outer wall 26*b* of the head section, a blank for an inner wall 30*a* of the filling section 30, a blank for an outer wall 30*b* of the filling section 30, a blank for the inner wall 22*a* of the thorax section, and a blank for the outer wall 22*b* of the thorax section 22. The blanks that belong to one section are congruent. As seen from FIG. 6, the outer wall 26*b* of the head section 26 has a first overflow opening 31; the inner wall 30*a* and outer wall 30*b* of the filling section 30 each have an overflow opening (second overflow opening and third overflow opening 32, 33), and the inner wall 22*a* of the thorax section 22 has a fourth overflow opening 34. The overflow openings 31, 34 of the head section 26 and the thorax section 22 are each located in a tapered region, the tapered region of the head section 26 pointing downward in the assembled state; the tapered region of the thorax section 22 pointing upward in the assembled region.

FIGS. 7 and 8 show the side airbag 20, which has been assembled, for example sewn, fused, or glued together using the described blanks. In the example shown, the side airbag 20 is sewn. In FIG. 7, hidden edges are drawn with dotted lines and visible seams are shown with a dot-dashed line. Hidden seams are not drawn in for the sake of clarity. It can be seen from FIGS. 7 and 8 that the filling section 30 surrounding the filling chamber is located between the head section 26 and the thorax section 22, whereas the outer wall 26*b* of the head section 26 is connected to the inner wall 30*a* of the filling section 30 by means of a first connecting seam 60, which extends around the first and second overflow openings 31, 32, which rest one atop the other. Analogously, the outer wall 30*b* of the filling section 30 is connected to the inner wall 22*a* of the thorax section 22 by means of a second connecting seam 62, which extends around the third and fourth overflow openings 33, 34, which rest one atop the other (shown only in FIG. 8). Inner and outer wall of the head sections are connected by means of a second edge seam 65, and inner and outer wall of the thorax section by means of a third edge seam 66. Instead of the seams described here, fused or glued lines could also be made.

FIG. 9 shows a housing 45, in which the head-section package 26' can be accommodated. The housing 45 is open at the top and on one side. The head section 26 can emerge from the upper opening; the filling section 30 extends through the lateral opening 47 to the head section 26, as indicated in FIG. 1. The housing 45 is detachably connected to the upper region 18c of the frame 18, for which fastening clips could be used. It is also possible to make the housing 45 as one piece with the frame 18, for example by welding the housing 45 to the frame.

In the exemplary embodiment of the housing 45, the lateral walls are of equal height. However, it might in many cases be preferable to design the front wall 45a as lower than the other walls, or to leave it out entirely, in which case the upper opening 45 becomes an "upper front opening." This can be advantageous, because, as described, the head section 26 of the lateral airbag 20 deploys upward and at the front.

Figure 10:
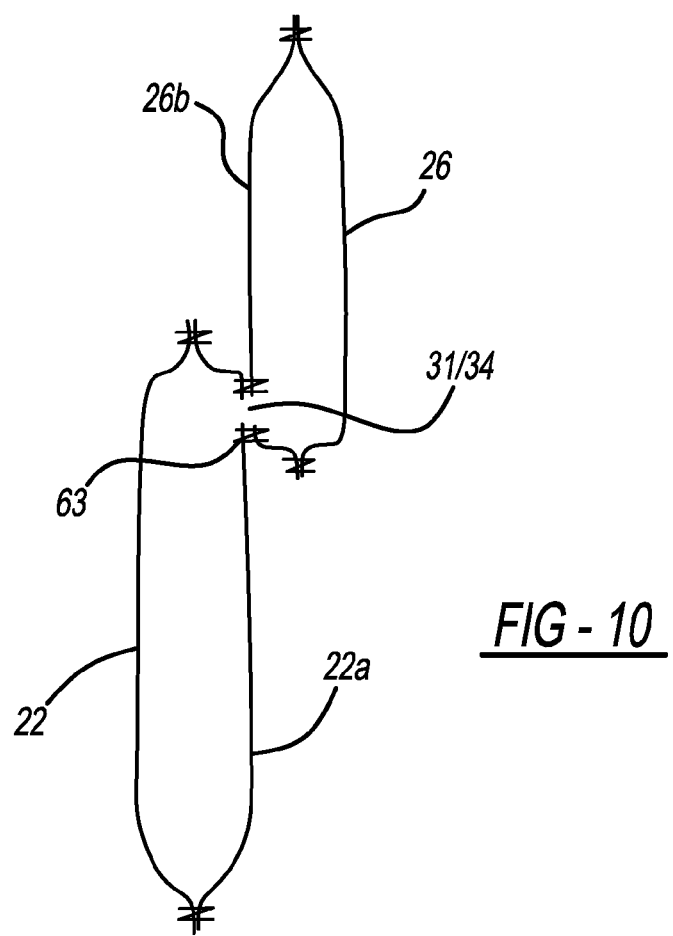
FIG. 10 shows a variation of the side gas bag shown in FIGS. 6-8, in a representation corresponding to FIG. 8.

FIG. 10 shows an alternative embodiment of a lateral airbag 20 in a representation corresponding to FIG. 8. It is evident that this lateral airbag 20 has no filling chamber, but rather that the outer wall 26b of the head section 26 and the inner wall 22a of the thorax section are directly connected around the overflow openings 31, 34, i.e. they are sewn together by means of the connecting seam 63. The lateral offset between the head section 26 and the thorax section 22 is thus somewhat smaller than in the exemplary embodiment in FIG. 8.

In order to facilitate the mounting of the lateral airbag 20 on the frame 18, it can be advantageous to first mount the lateral airbag on an L-shaped support, the thorax section package being arranged on the long limb of the L and the housing for the head-section package on the short limb of the L.

In an assembled state, when the support is mounted on the frame, the short limb is then on top.

Furthermore, it should be mentioned that a pelvis section can be attached below, on the thorax section, or the thorax section can be designed as so large that it covers the passenger's pelvic area. In this case, the thorax section could also be termed the thorax-pelvis section.

While the above description constitutes the preferred embodiment of the present invention, it will be appreciated that the invention is susceptible to modification, variation, and change without departing from the proper scope and fair meaning of the accompanying claims.

What is claimed is:

1. A side airbag device for a vehicle seat of the type having a backrest extending in a transverse direction of the vehicle, the backrest having at least one lateral region and an upper region, and a headrest extending from the upper region, the side airbag device being configured to be arranged in the backrest and comprising:
an inflator and
a side airbag having a thorax section enclosing a thorax chamber in fluid communication with the inflator, and a head section separate from the thorax section and enclosing a head chamber, the thorax section and the head section each being configured to be arranged in or on the backrest and each having an inner wall that forms an impact surface, and an outer wall, the head section configured to emerge from the upper region of the backrest beside the headrest upon actuation of the inflator, the inner wall of the head section configured to be offset in a transverse direction of the vehicle relative to the inner wall of the thorax section upon complete expansion of the airbag, the inner wall of the thorax section and the outer wall of the head section each having an overflow opening, the overflow openings being in fluid communication via a filling section of the side airbag and configured to allow a gas overflow from the thorax chamber into the head chamber.

2. The side airbag device according to claim 1, further comprising that the filling section also features an outer wall with an overflow opening and an inner wall with an overflow opening, wherein the outer wall of the filling section is connected to the inner wall of the thorax section around the respective overflow openings, and the inner wall of the filling section is connected to the outer wall of the head section around the respective overflow openings.

3. A vehicle seat comprising a side airbag device according to claim 1.

4. A vehicle seat according to claim 3, further comprising a housing arranged in the upper region of the backrest, the housing having an upper opening, through which the head section emerges during expansion.

5. A vehicle seat according to claim 4, further comprising that the housing has a side opening.

6. A safety device for an automotive vehicle, comprising:
a vehicle seat having a backrest extending in a transverse direction of the vehicle, the backrest having at least one lateral region and an upper region, and a headrest extending from the upper region;
a side airbag device arranged in the backrest and having:
an inflator; and
a side airbag including a thorax section enclosing a thorax chamber in fluid communication with the inflator, and a head section separate from the thorax section and enclosing a head chamber, the thorax section and the head section each arranged in or on the backrest and each having an inner wall that forms an impact surface, and an outer wall, the head section configured to emerge from the upper region of the backrest beside the headrest upon actuation of the inflator, the inner wall of the head section configured to be offset in a transverse direction of the vehicle relative to the inner wall of the thorax section upon complete expansion of the airbag, and the inner wall of the thorax section and the outer wall of the head section each having an overflow opening, the overflow openings being in fluid communication and configured to allow a gas overflow from the thorax chamber into the head chamber; and
a safety belt having an applied state configured to extend through a gap between the head section and the thorax section of the side airbag after inflation of the airbag.

* * * * *